United States Patent
Kumar et al.

(10) Patent No.: US 7,933,389 B2
(45) Date of Patent: Apr. 26, 2011

(54) SYSTEM AND METHOD GENERATING VOICE SITES

(75) Inventors: Arun Kumar, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/612,787

(22) Filed: Dec. 19, 2006

(65) Prior Publication Data
US 2008/0144783 A1  Jun. 19, 2008

(51) Int. Cl.
H04M 1/64  (2006.01)

(52) U.S. Cl. ........................... 379/68; 379/88.23

(58) Field of Classification Search ............... 379/67.1, 379/88.17, 88.22, 88.23, 88.25, 68, 201.03
See application file for complete search history.

(56) References Cited

U.S. PATENT DOCUMENTS

| | | | |
|---|---|---|---|
| 5,915,001 A * | 6/1999 | Uppaluru | 379/88.22 |
| 6,240,391 B1 * | 5/2001 | Ball et al. | 704/270 |
| 6,405,170 B1 * | 6/2002 | Phillips et al. | 704/270 |
| 6,587,547 B1 | 7/2003 | Zirngibl et al. | |
| 6,765,997 B1 | 7/2004 | Zirngibl et al. | |
| 6,810,111 B1 * | 10/2004 | Hunter et al. | 379/1.02 |
| 6,829,334 B1 | 12/2004 | Zirngibl et al. | |
| 6,856,676 B1 | 2/2005 | Pirot et al. | |
| 6,940,953 B1 | 9/2005 | Eberle et al. | |
| 6,950,441 B1 | 9/2005 | Kaczmarczyk et al. | |
| 6,950,502 B1 | 9/2005 | Jenkins | |
| 6,964,012 B1 | 11/2005 | Zirngibl et al. | |
| 7,016,848 B2 | 3/2006 | St John Brittan et al. | |
| 7,020,251 B2 | 3/2006 | Zirngibl et al. | |
| 7,457,397 B1 * | 11/2008 | Saylor et al. | 379/88.17 |
| 7,486,780 B2 * | 2/2009 | Zirngibl et al. | 379/88.17 |
| 7,539,287 B2 * | 5/2009 | Hunter et al. | 379/1.02 |
| 7,551,723 B2 * | 6/2009 | Mills et al. | 379/1.02 |
| 7,590,229 B2 * | 9/2009 | Bangor et al. | 379/142.06 |
| 2004/0181599 A1 | 9/2004 | Kreusch et al. | |

FOREIGN PATENT DOCUMENTS

WO  WO 200477857  9/2004

OTHER PUBLICATIONS

Grossoni, M. Mattarella, F. Telecom Italia S.p.a., Roma; "Innovative energy solutions for telecom networks in the new highly competitive environment" Twenty-Second International Telecommunications Energy Conference (Cat. No. 00CH37131), pp. 51-57, Published: Piscataway, NJ, USA, 2000, xx+777 pp.

(Continued)

*Primary Examiner* — Olisa Anwah
(74) *Attorney, Agent, or Firm* — Gibb I.P. Law Firm, LLC; Derek S. Jennings

(57) ABSTRACT

A system and method for generating and providing a voice-site on a linked network of voice-sites over a network. A voice call is received from a subscriber at the first voice site, the first voice site hosted on a server and the subscriber is associated with the first voice site. The subscriber is configured to create and personalize a second voice site starting from the first voice site by specifying personal preferences of the subscriber and available components on the server, and the second voice site created by the subscriber comprises a list of services offered by the subscriber, and then host the second voice site on the server.

16 Claims, 11 Drawing Sheets

OTHER PUBLICATIONS

Adve SV; Pai VS; Ranganathan P "Recent advances in memory consistency models for hardware shared memory systems" Proceedings of the IEEE, vol. 87, No. 3, pp. 445-455, Mar. 1999.

Luis Francisco-Revilla, Frank M. Shipman III, Richard Furuta, Unmil Karadkar, Avital Arora "Perception of Content, Structure, and Presentation Changes in Web-based Hypertext", 2001 ACM.

Gordon Bell; Jim Gemmell "On-ramp Prospects for the Information Superhighway Dream" Communications of the ACM (Commun. ACM) ISSN 0001-0782 CODEN CACMA2 Communications of the Association for Computing Machinery, vol. 39, No. 7, Jul. 1996.

Michael F. M. C. Tear. University of Ulster "Spoken Dialogue Technology: Enabling the Conversational User Interface", ACM Computing Surveys, vol. 34, No. 1, Mar. 2002, pp. 90-169.

* cited by examiner

SYSTEM AND METHOD GENERATING VOICE SITES

FIELD OF THE INVENTION

This invention generally relates to a method and system for creating and hosting voice sites on servers over a network, preferably a voice server and over a telecommunication network.

BACKGROUND OF THE INVENTION

The World-Wide Web (WWW) operates over the Internet infrastructure enabling services such as email, web browsing, online shopping and the like. The Internet primarily provides data services to users, for example, the ability to create and personalize a website/webpage, online shopping, accessing web services, and the like. The Internet has also been used to provide voice related services and has become a parallel telecommunications network providing voice communication services including voice over Internet protocol (VoIP), voice extended markup language (VoiceXML) etc. A number of Internet web sites provide a voice interface by playing audio files and accepting audio inputs.

In typical telecommunication based networks, service providers offer basic data services such as short message service (SMS), email, sports updates, news, and the like. A disadvantage of the current telecommunication service is the limitation of users' access to the data services, as users' do not have the control or ability to provide such applications. Moreover, the information available on the Internet is available to people who can access the Internet through digital infrastructure. A further disadvantage of the system is that due to the absence of voice and digital information to the users, there is a need for an infrastructure that would enable a user, for example a telephone user, to provide and control data services to other telephone users.

Although various user interfaces have been developed to enable users to access the content over the Internet through server systems, many such systems experience significant drawbacks. All of these systems require that the user connect via a computer system to the server system to initiate reports and view the contents of the reports, a time consuming way of obtaining necessary information Without a way to improve a method and system for creating and hosting voice sites, the promise of this technology may never be fully achieved

SUMMARY OF THE INVENTION

A first aspect of the invention provides a method for receiving a voice call from a subscriber to a first voice site on a server, preferably a voice server, over a network. The first voice site is hosted on the server and is associated with the subscriber. The first voice-site is configured so that the subscriber is able to create and personalize a second voice site starting from the first voice site by specifying personal preferences of the subscriber and by using the components available on the server. The second voice site thus created by the subscriber contains a list of various services that are offered by the subscriber. After, creation of the second voice sites, the voice sites are hosted on the server.

In a further embodiment, a caller, who is different from the subscriber, can place a call into another voice site. The server is arranged to identify the caller. The server interacts with the caller, preferably via a interactive voice response module, and directs the voice call to an appropriate voice site of the subscriber. Preferably, the interaction is done dynamically in real time. Optionally, the caller can directly place a voice call to the voice site of the subscriber. If the services are identified, then the caller is provided with the appropriate response, which contains the services requested by at the subscribers voice site.

A second aspect of this invention provides a system for generating voice sites. A receiving means is configured to receive a voice call from a subscriber at a first voice site, the first voice site associated with the subscriber. After the voice call is received from the subscriber, a processing means is configured to enable the subscriber to create and personalize a second voice site starting from the first voice site by specifying personal preferences of the subscriber and by using the available components on the server, and the second voice site created by the subscriber comprises a list of services offered by the subscriber; and the system further contains a means for hosting the second voice site on the server.

In a further embodiment, the receiving means is further configured to receive a voice call from a caller at the server wherein the voice call from the caller is directed to the subscriber and configured to identify the caller. After receiving the voice call from the caller the processing means configured to direct the voice call received from the caller to an appropriate voice site of the subscriber hosted on the server by dynamically interacting with the caller in real time. The processing means is further configured to provide the caller with an appropriate response, the response comprising services available at the subscriber's voice site.

A third aspect of this invention provides a signal bearing medium comprising a voice call from a subscriber embodied in a carrier wave is received at a first voice site on a server and processed by a processing means enabling the subscriber to create and personalize a second voice site starting from the first voice site by specifying personal preferences of the subscriber and using the available components on the server, wherein the second voice site comprises a list of services offered by the subscriber; and host the second voice site on the server.

In yet a further embodiment, this invention provides a signal bearing medium comprising a voice call from a caller embodied in a carrier wave is received at a voice site on a server wherein the voice call from the caller is processed by a processing means configured to identify the caller and direct the voice call received from the caller to an appropriate voice site of a subscriber hosted on the server by dynamically interacting with the caller in real time; and to provide the caller with an appropriate response, the response comprising services available at the subscribers voice site.

These and other aspects, advantages, and salient features of the present invention will become apparent from the following detailed description, the accompanying drawings, and the appended claims.

DETAILED DESCRIPTION

Figure 1:
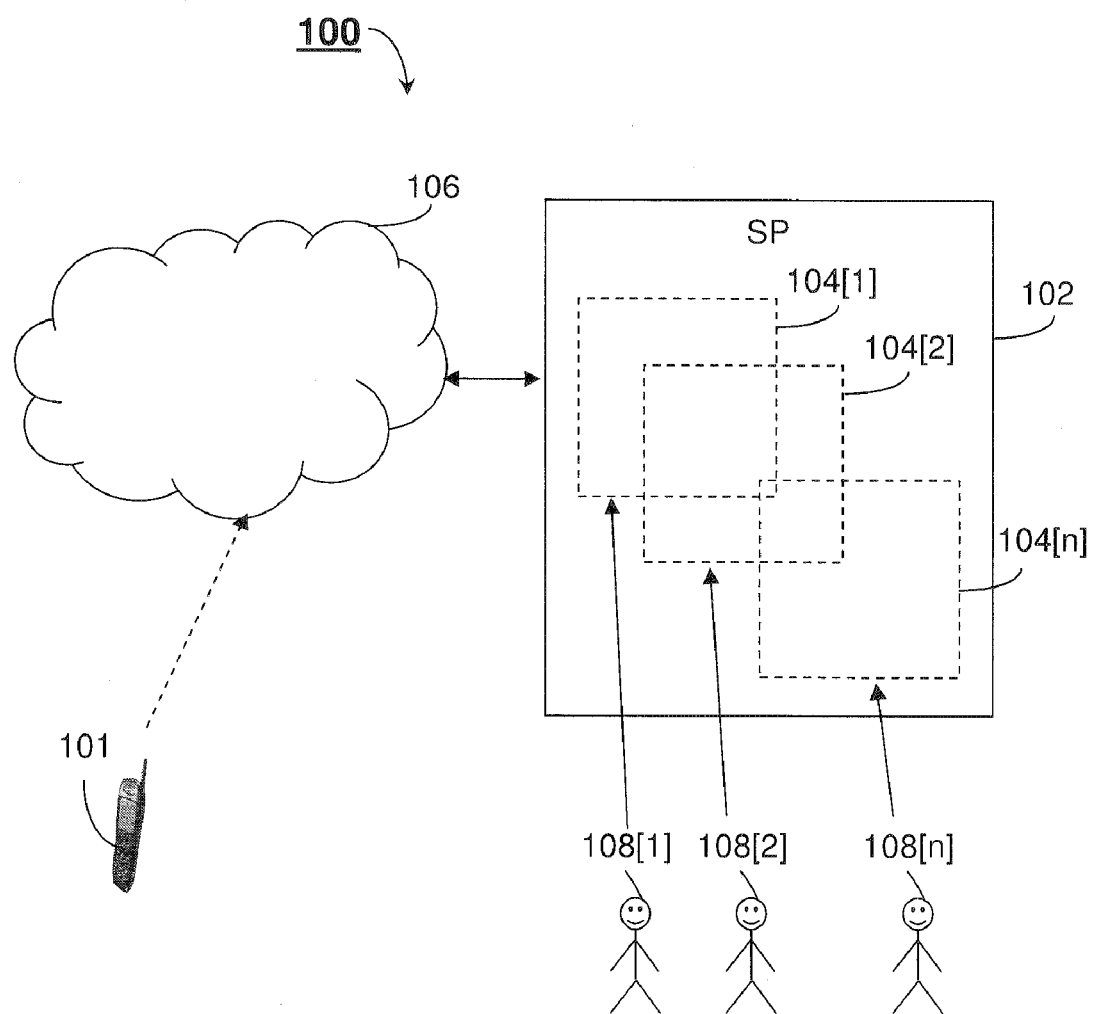
FIG. 1 illustrates an exemplary embodiment of an overview of the system in accordance this invention.

FIG. 1 illustrates a linked network of voice sites 100 comprising a caller's communication device 101 (e.g. telephone, mobile phone, personal digital assistant etc.), communicating with a service provider (SP) 102, preferably a telecom service provider, capable of hosting a plurality of voice sites 104 [1-*n*] via a network 106, preferably a telecommunication network. The network 106 may be a wired network, a wireless network or a combination thereof. The voice sites 104 [1-*n*] are created by a subscriber 108 [1-*n*] respectively, subscribed to SP 102.

The voice sites are configurable and customizable by Interactive Voice Response (IVR) module associated with the SP 102. The IVR and data services available at the SP 102 are shared and coupled with the ease of creating a further voice sites and customizing it to personal (individual) preferences. The IVR and data services hosted by the SP 102 are similar to the manner in which websites and Internet servers are hosted by a typical Internet Service Providers (ISP). FIG. 1 further illustrates that the subscribers as well as the callers, who is different from the subscriber, are capable of communicating with the SP 102 via the network. It should be apparent to a person skilled in the art that the subscriber and the caller may reside on different networks and can communicate using a suitable protocol.

Figure 2:
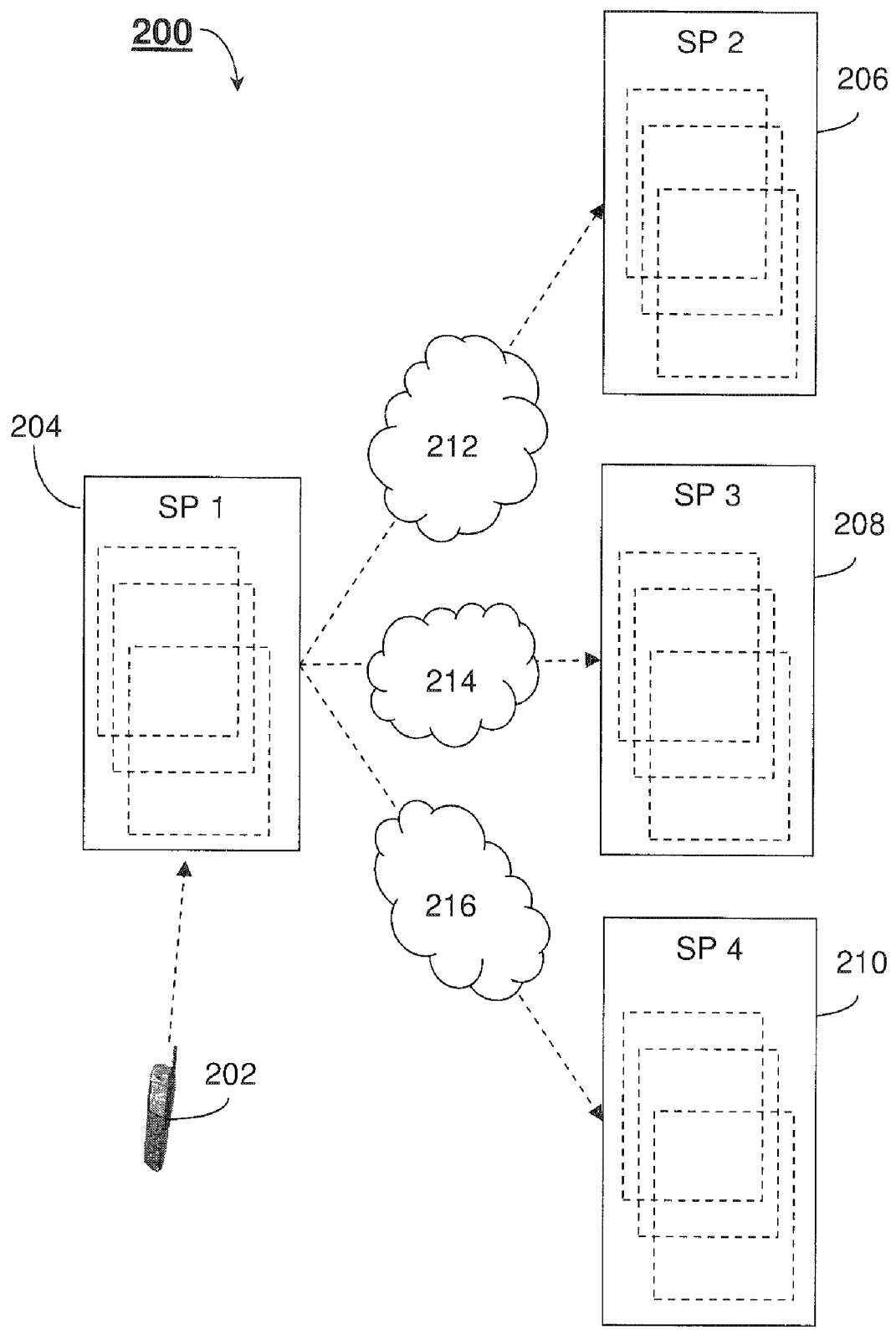
FIG. 2 illustrates a block diagram relating to communication between a caller and subscribers of different networks.

FIG. 2 illustrates an exemplary embodiment of a communication relation between a caller 202 and subscribers based in of different networks. FIG. 2 illustrates a caller 202 subscribed to a SP 204. The SP 204 communicates with multiple telecommunication service providers, for example, 206, 208 and 210 via networks 212, 214 and 216 respectively, and as described previously, and the network can be a wired network, wireless network or a combination thereof. Each SP is configured to and is capable of hosting a plurality of voice sites. Some examples of the networks include Global System for Mobile communication (GSM) networks, Code Division Multiple Access (CDMA) networks, Public Switched Telephone Network (PSTN) and the like.

When a caller 202 calls a subscriber belonging to one of the service provider 206, 208, or 210, the service provider 204 receives the call first. The voice call is analyzed and the destination of the called party is determined. The call is transferred to the determined service provider via the network. The caller is then configured to interact with the voice site of the called party, in this case the subscriber's voice site, and depending upon the interaction with the voice site, the voice call may be transferred to the called party (subscriber).

Figure 3:
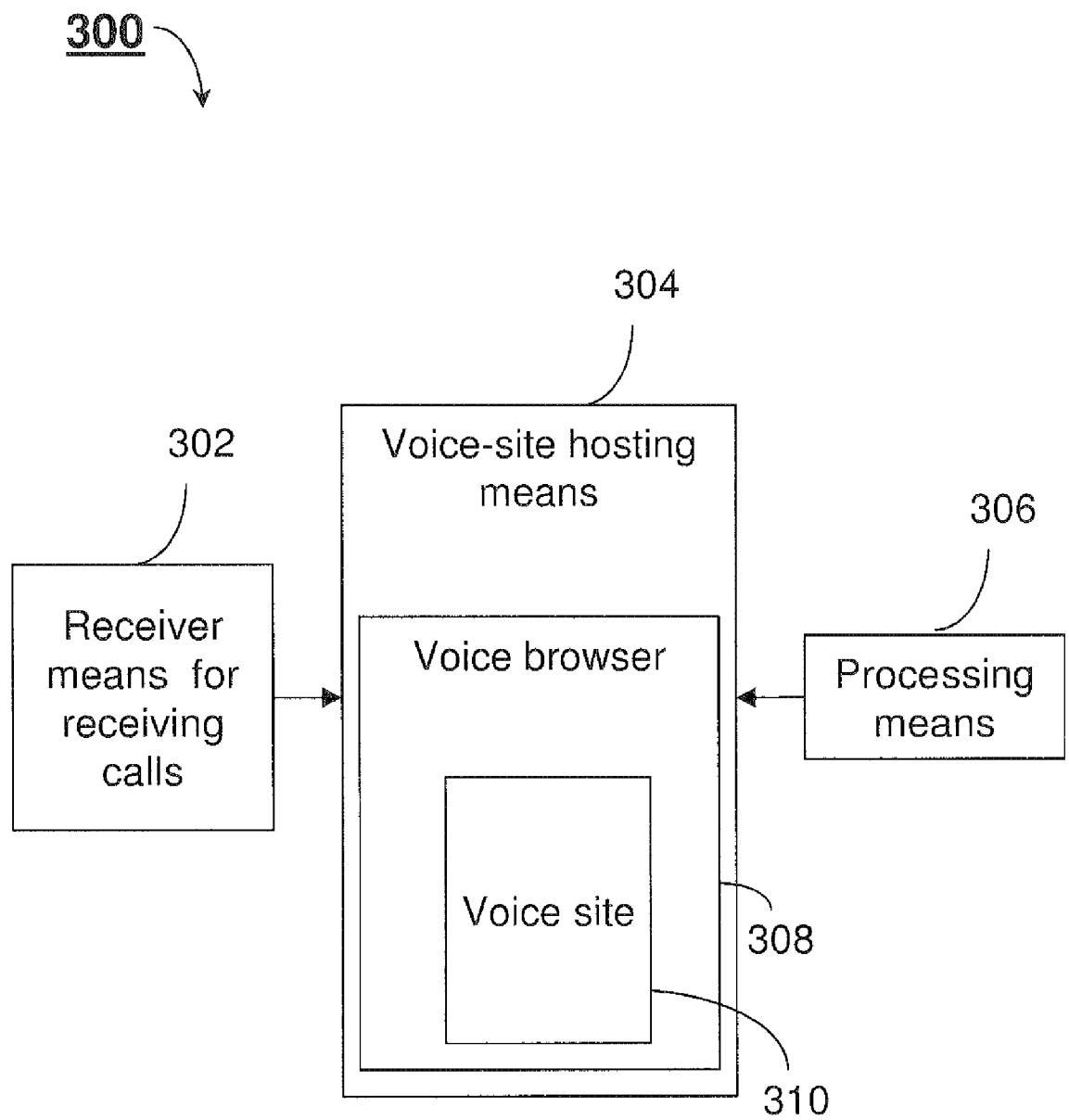
FIG. 3 is a block diagram of a system used by a SP for hosting a voice site on a linked network of voice sites.

FIG. 3 is a block diagram of a system 300 used by a Service Provider for hosting a voice site, and providing access to create new voice sites, edit and/or customize already available voice sites on the linked network of voice sites. The system 300 includes a receiving means 302, which is configured to receive voice calls from a caller and/or a subscriber. The system 300 further comprises a voice-site hosting means 304 which is configured to host the voice site, wherein the voice sites are already available voice site and/or newly created voice sites and/or voice sites that are edited and customized as per the subscriber's requirement. A processing means 306 is interfaced with the receiving means 302 and the voice site hosting means 304, where the processing means is configured to enable the subscriber to create and personalize the voice site, wherein the voice site comprises a list of services offered by the subscriber. In one embodiment, the voice-site hosting means 304 may comprise a voice browser 308 hosting a voice-site 310 and is coupled receiving means 302 and the processing means 304.

The processing means 304 enables a subscriber to create and personalize voice-site 310; and/or create new voice sites and link the already available voice site with the newly created voice site. The processing means 304 allows creation of personalized voice-site 310 through at least one of a voice interface and a web interface. Voice-site 310 comprises content for a caller that the subscriber is capable of offering service to. The content may for example include a voice message and/or a text message. In a further embodiment, personalization of the voice site to a caller includes developing a different answer for a different caller. The voice site is linked to other voice sites created by other subscribers to build a linked network of voice sites on the network.

Voice-site 310 and/or the processing means 304 comprise one or more IVR modules, and each module may be configured to a particular phone number. It should be apparent to a person skilled in the art that a common IVR module may be deployed for a plurality of phone numbers on the voice site and/or the processing means. The IVR module may be created/configured using a design or technology known in the art. In one embodiment, the IVR module is configured to provide a menu options that act as one or more mini-portals to the products/services that are offered by the subscriber.

The voice-site hosting means 304 can comprises the voice browser 308 that presents voice-site 310 using presentation and user interface components, to the subscriber and/or the caller. In an embodiment, the voice-site hosting means 304 hosts all the voice sites of all the subscribers of a service provider on a network. The hosting of the voice sites includes for example, associating the voice site to the subscriber's telephone number. Further, the voice-site hosting means 304 is also configured to maintain a registry of all caller-numbers, all callee-numbers and the corresponding voice application (VXML) to be executed for a particular caller and/or callee number as required. Further, the voice-site hosting means 304 contains information related to the voice sites. The information includes, without limitation, subscribers names, products or services offered by the subscribers and the like. The voice-site hosting means 304 provides a number of applications to be implemented including text-based search capability on the voice sites, for example, a search query to be provided in voice or a search result to be displayed in voice.

In one embodiment, the processing means 304 is configured to pre-filters voice calls based on the callers number/voice and transfers the voice call to the correct voice site, and may be further configured to transfer/forward the voice calls and meter them accordingly.

In accordance with the present invention, a voice call made by the caller using a voice-enabled calling device terminates at voice-site hosting engine 304 instead of terminating at the handset of the subscriber. The processing means 306 forwards the call to the voice-site hosting means 304. Each voice call from a caller is mapped onto an IVR module in the subscriber's voice site. In one embodiment, the caller may have an exclusive IVR module or may share a single IVR module. Further, the voice-site hosting means 304 is configured to select an appropriate response to the voice call, based on the identity of the caller and to provide for a conversation between the caller and voice-site 310. Based on the content of the conversation between the caller and the IVR module, the voice-site hosting means 304 terminates the voice call or routes the voice call either to the subscriber's handset, or to a voice mail box or to the IVR module of another caller. The IVR module of another caller may belong to voice-site hosting means 304 or to a voice-site hosting means based in another network belonging to another service provider.

As a result of the conversation between caller and the IVR module, the voice-site hosting means 304 may invoke data services residing either in the telecommunication networks or in the Information Technology (IT) networks. The interaction protocols used in the former case would be telecommunication specific and include communication protocols such as Session Initiation Protocol (SIP) while the interaction with services in the IT world may be done using service oriented architecture (SOA) Application Programming Interfaces (APIs) such as Web Services. In accordance with an embodiment of the present invention, when the voice call is forwarded to the IVR module of the caller, the voice-site hosting means 304 may be configured to provide a call summary to the subscriber after the voice call is terminated.

In one embodiment of the present invention, the voice-site hosting means 304 in association with the processing means 306 is configured to forward the voice call received at the receiving means 302 to the subscriber's handset based upon the interaction of the caller with subscriber's voice-site 310. In a further embodiment, if the voice-site 310 is not present, the voice-site hosting means 304 in association with the processing means 306 is configured to forward the voice call to the subscriber's handset. Some examples of voice-enabled calling devices, without limitation, include a Public Switched Telephone Network (PSTN) phone, a mobile handset, a Personal Digital Assistant (PDA), and a Voice over Internet Protocol (VoIP) phone.

Figure 4:
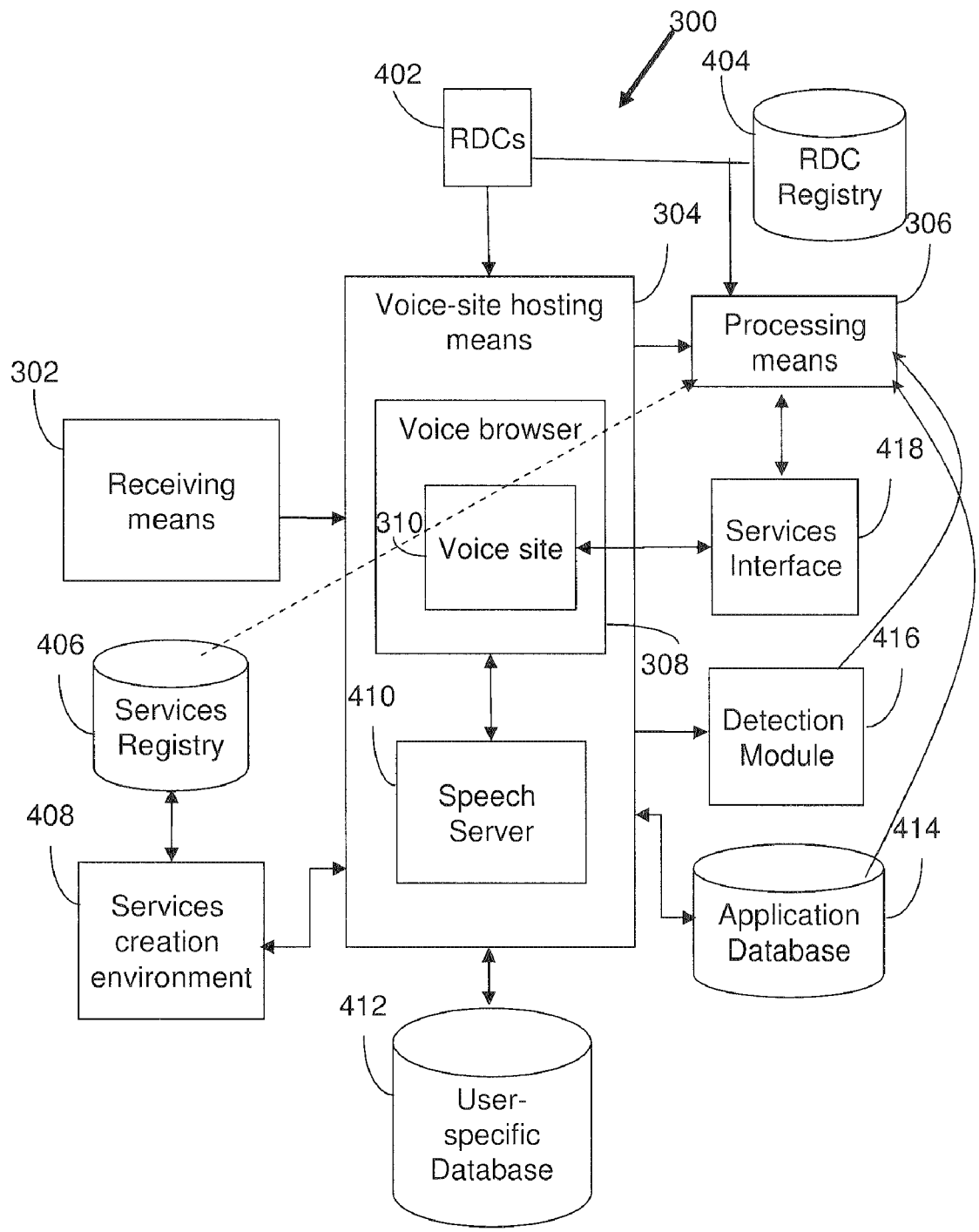
FIG. 4 illustrates the detailed view of the system.

FIG. 4 illustrates system 300 in accordance with a further embodiment of the present invention. In addition to personalized receiving means 302, voice-site hosting means 304 and the processing means 306, system 300 contains a Reusable Dialog Components (RDCs) 402, an RDC registry 404, a services registry 406, a service creation environment 408, a speech technologies server 410, a user-specific database 412, an application database 414, a detection module 416, a services interface 418, and a call transfer module 420. RDCs 402, service creation environment 408, user-specific database 412, application database 414, detection module 416, are coupled to voice-site hosting means 304 and/or the processing means 306. RDC registry 404 and services registry 406 are coupled to processing means 306. Speech technologies server 410 is coupled to voice browser 308 while services interface 418 is coupled to voice-site 310.

RDCs 402 are coupled to personalized processing means 306 and the voice-site hosting means 304 and are a set of pre-existing configurable available components, voice User Interface (UI) components and presentation components that are used to create/generate the voice-site 310, thereby avoiding the need to develop the entire UI. Voice-site 310 can be built speedily by using existing RDCs 402 instead of creating the voice dialogs of the IVR module from scratch. Thus, RDCs 402 are selected and configured while creating voice-site 310. However, RDCs 402 included in voice-site 310 are executed at the voice-site hosting means 304 and the processing means 306. RDC registry 404 is a database that maintains a list of all available RDCs 402 along with their descriptions at personalized voice-site creator 302.

In a further embodiment, voice-site hosting means 304 and the processing means 306 is coupled to services registry 406 that maintains a registry of services offered by various subscribers of at least one service provider. The services includes, without limitation, maps and directory services, banking services, stocks/sports updates, electronic stores, location tracking services, and online ticketing. In a further embodiment, while a subscriber creates a voice site using personalized processing means 306, the subscriber may refer to services registry 406 to select a service which the subscriber may wish to hyper-voice link to its voice site.

In a further embodiment, voice-site hosting means 304 and the processing means 306 are coupled to service creation environment 408 that provides a mechanism for creating new services on voice-site 310 from existing components in a semi-automatic way. It is an alternative to manually creating new services that are not currently available. Once a subscriber creates a new service, it is stored in services registry 406.

The voice browser 308 interacts with speech server 410 which provides speech recognition and synthesis required to render and capture voice output/input during the conversation between the caller and the IVR module corresponding to the caller in the subscriber's voice site.

In a further embodiment, the system comprises user-specific database 412 coupled to voice-site hosting engine 304 that stores, without limitation, caller-numbers, callee-numbers and the corresponding voice application (VXML) to be executed. User-specific database 412 may further store alarms, calendars, favorites, and the like, thereby pushing handset services to the telecommunication network and enabling device-independent self-services. The IVR module may be customized for self use of the above-mentioned services.

In a further embodiment, the voice-site hosting means 304 and the processing means 306 is coupled to application database 414 that stores, without limitation, application details of the subscribers for forwarding a call. The application details include, without limitation, time duration during which a subscriber wishes to receive a voice call on his handset, time duration during which a subscriber wishes to receive a voice call on his IVR module, voice message to be delivered to a caller and the like. Based upon the application details the voice call is forwarded to one of a voice site (for example, the IVR module), and a phone number. An advantage being that multiple subscribers can now share a single handset. For example, a subscriber may set a time slot during which he would possess the handset for receiving calls while at other times he might enable his voice site to receive the calls. Thus, multiple subscribers with different phone numbers may share the handset for pre-defined time durations. The time slot may be pre-defined or may be activated/deactivated manually or without any human intervention.

In a further embodiment, the voice-site hosting means 304 and the procession means 306 is coupled to detection module 416 that identifies and authenticates a caller and filters or forwards the call to a particular IVR module or to the subscriber based upon the caller. The authentication comprises at least one of Personal Identification Number (PIN) verification, speaker identification and caller-id verification. For example, a personal call or a business call may lead to a PIN code entry followed by either a personalized greeting message based on at least one of caller-id, time and speaker-recognition or detailed messages.

In a further embodiment, the system 300 comprises services interface 418 that enables services including, but not limited to, call forwarding, voice mailbox, location tracking, SMS service, stock sports, rich presence information, banking services, data services and maps and directory facility that can be utilized by a voice-site hosted on voice-site hosting engine 304. The location tracking service enables geographical location of a subscriber (i.e., a callee) to be tracked. The Short Message Service (SMS) service includes a message forwarding facility, a message storage facility, and a message searching facility. Other data services may include, without limitation, driving directions, calendar schedule or any other information that the subscriber has configured, to be played to the caller. Other information may include, without limitation, a personalized tune, song, video clip, and commentary to be played either when the caller is on call waiting or otherwise.

Data services also include credit card authorization, online shopping, i.e., a phone-store (e.g. bookstore, grocery, and the like) using item-codes, quantity etc., and a phone-business realization. With each call and confirmation number, the voice site may play the current status and play options for further action. Also, the IVR module may be configured or customized manually or programmatically with the help of a human administrator for Small to Medium Businesses (SMBs), and Small Office-Home Office (SOHO) users since their IVR options might be quite complex and extensive in nature.

In a further embodiment, a generic IVR module may deal with unknown numbers and telemarketers. Enabling such an IVR module allows WWTW to facilitate reducing of spam calls with voicemail/online voice message searching/filtering for new numbers.

In a further embodiment, with support from device manufacturers, some emergency services can be provided. For instance, a special option (for example, PIN code protected) for emergency calls may override device settings such as vibrator mode, call forwarding, and call waiting supported by the subscriber's handset and transfer the voice call directly to the subscriber In a further embodiment, a subscriber can create its voice site as follows:

Level 1: A menu-based IVR module asks for prompts and choices from a subscriber who wishes to create a voice site. A voice extended markup language (VXML) based presentation layer generates target VXML through the backend Java logic. The subscriber uses predefined structures for developing the menu-based IVR module which is analogous to developing a HTML page using text with radio buttons.

Level 2: A voice site is developed using pre-built RDCs 402. Further, the voice site comprises the developed menu-based IVR module. A presentation layer links the voice site with RDC registry 404 while the backend provides implementation to select from RDC registry 404. Further, the voice site comprises a mechanism to configure RDCs 402 through voice input. Examples of such mechanism include configuration of a date RDC. In accordance with one example, to configure a date RDC to be used as a date-of-travel for a railways reservation site, a date (for example, two-months-from-today's-date) is set beyond which ticket reservation is not permissible. In accordance with another example, to configure a date RDC to be used as the expiry date in a credit card, a date is set beyond which the cards will not be issued. Yet another example includes configuration of select1 RDC. The select1 RDC is a UI component that provides a UI to the user to select 1 option from a given list. The list can be configured to be for example, a set of trains for a railway web site, or a set of credit card types such as diners/master/visa.

Figure 5:
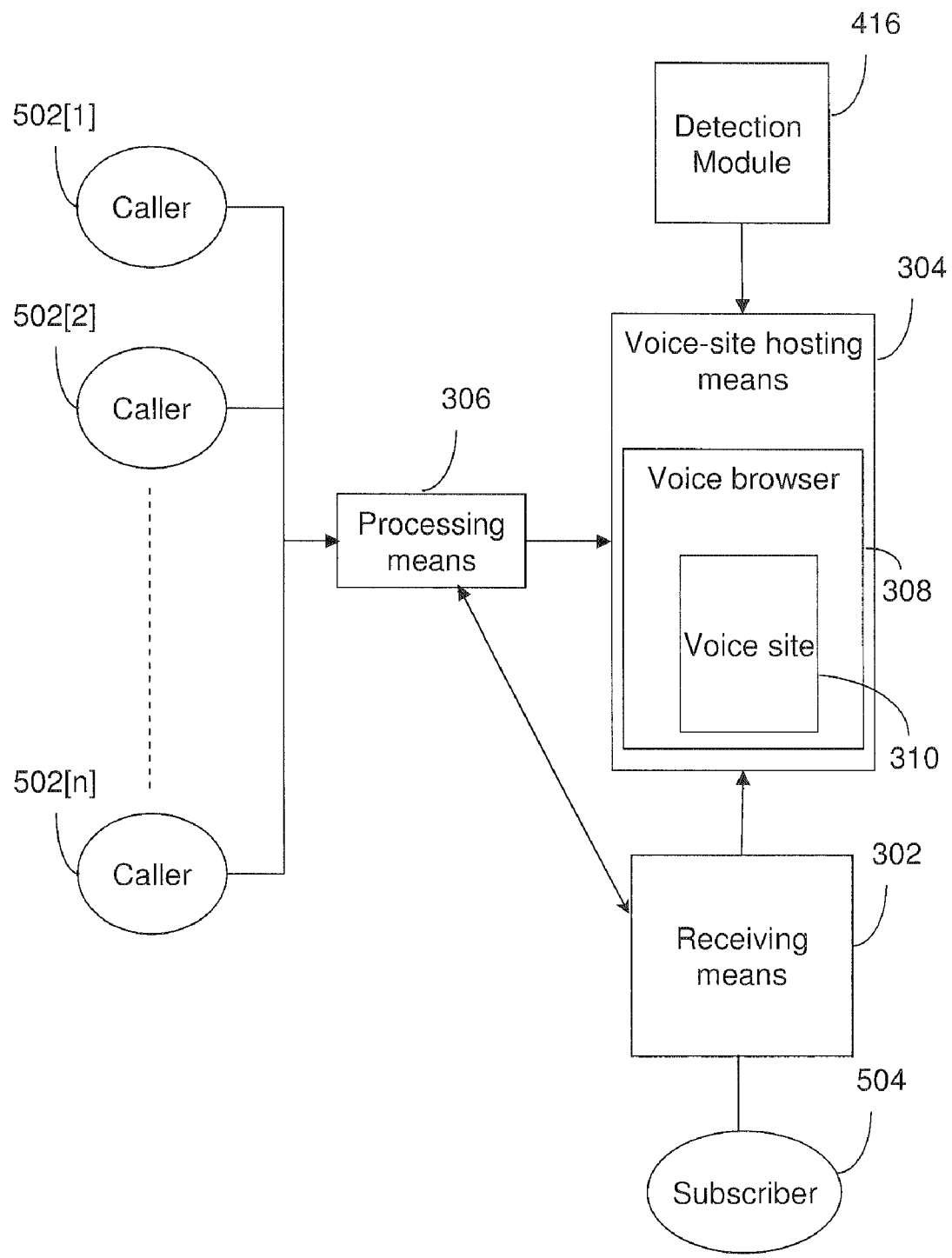
FIG. 5 illustrates a system with multiple callers calling a subscriber.

FIG. 5 illustrates a system with multiple callers 502[1-*n*] calling a subscriber 504 in accordance with an embodiment of the present invention. When multiple callers 502[1-*n*] call subscriber 504, each voice call from multiple callers 502[1-*n*] terminates at voice-site hosting means 304. The voice-site hosting means 304 in association with the processing means 306 transfers the voice calls to detection module 416 that filters the voice calls based on the callers' number/voice and forwards the voice call either to the corresponding IVR module or to subscriber 504 or to a forwarding number. In case subscriber 504 is busy, the IVR module for the corresponding caller number may interact with the caller, thereby avoiding missed calls. The IVR modules may be configured for different scenarios including when the subscriber's phone is off and when it not reachable.

It may be seen from the description of the embodiment in FIG. 5 that the present invention results in increased revenue to telecommunication service providers as each call translates into a charged call since the call is picked up by the IVR module. Further, the telecommunication service providers may accompany hosting charges for personalized or generic voice-site hosting. Also, each service offered by WWTW may attract different charging.

In a further embodiment of the current invention, the system stores and indexes meta-content about the various voice sites hosted on different networks. Along with storage, the system also provides a search facility that enables subscribers and callers to search through this information for various purposes. Thus information about the different types of voice sites can be accessed by searching through an interface. This can be thought of as similar to a web search through popular search sites such as google, yahoo, etc.

Figure 6:
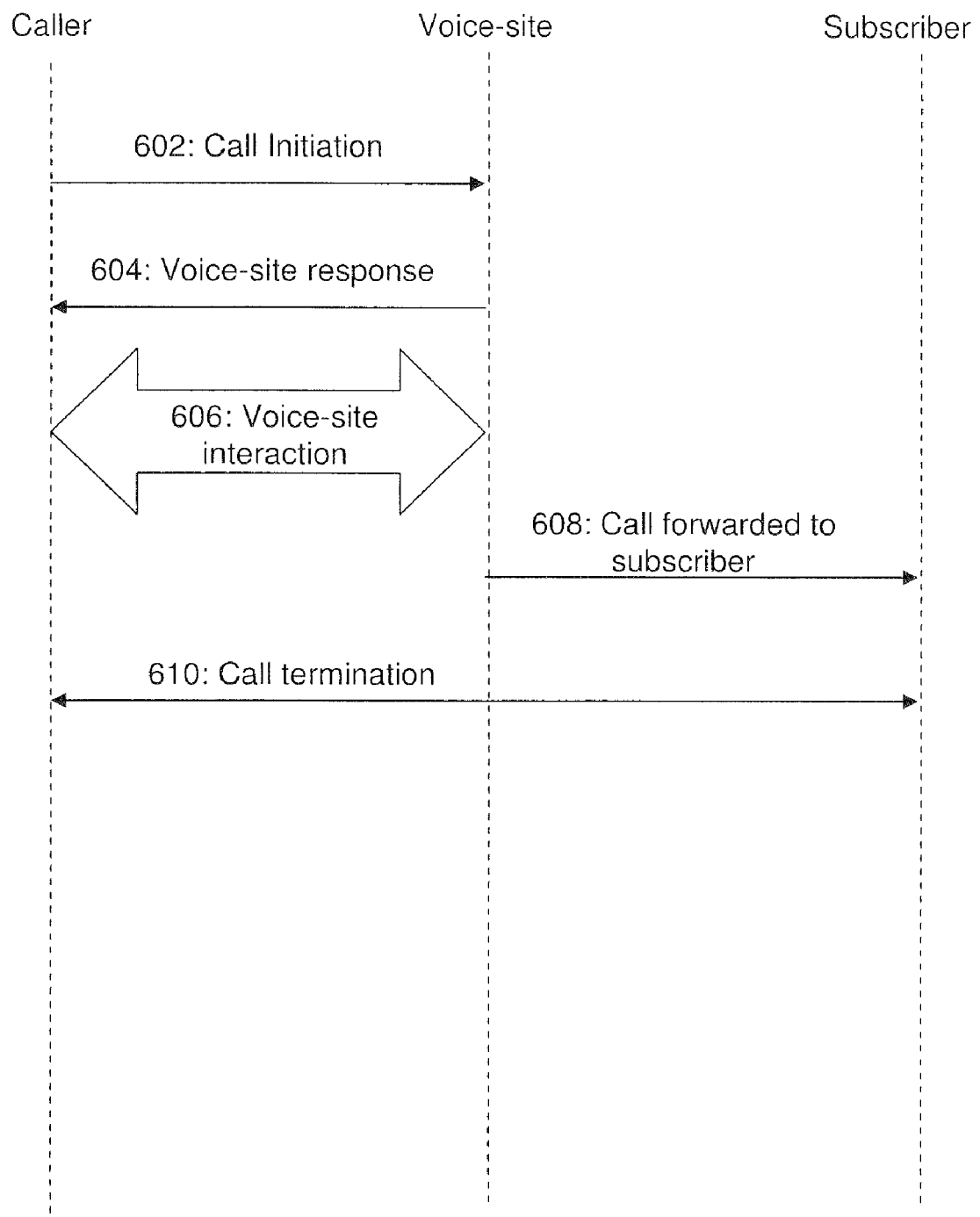
FIG. 6 is a schematic illustration of a call flow.

FIG. 6 illustrates a schematic representation of an embodiment of the present invention. A caller initiates a call directed to a subscriber at step 602. The receiving means and the voice-site hosting means receives the call. In accordance with an embodiment of the present invention, the IVR module of the voice-site corresponding to the caller's number may provide a response to the caller at step 604. For example, in healthcare applications, the doctor's voice site including the IVR modules corresponding to different patients may contain reports and detailed instructions of the doctor for each patient on the respective IVR modules. Further, the doctor's voice site may also contain links to other specialists (for example, a phone number linked as IVR menu option) and phone numbers providing relevant medical information. A voice-site interaction is established between the caller and the voice site at step 606.

In one embodiment of the present invention, the voice-site may forward the call to the subscriber because, for example, of the absence of required information or as a result of the voice-site interaction with the caller at step 608. The call is terminated at step 610.

Figure 7:
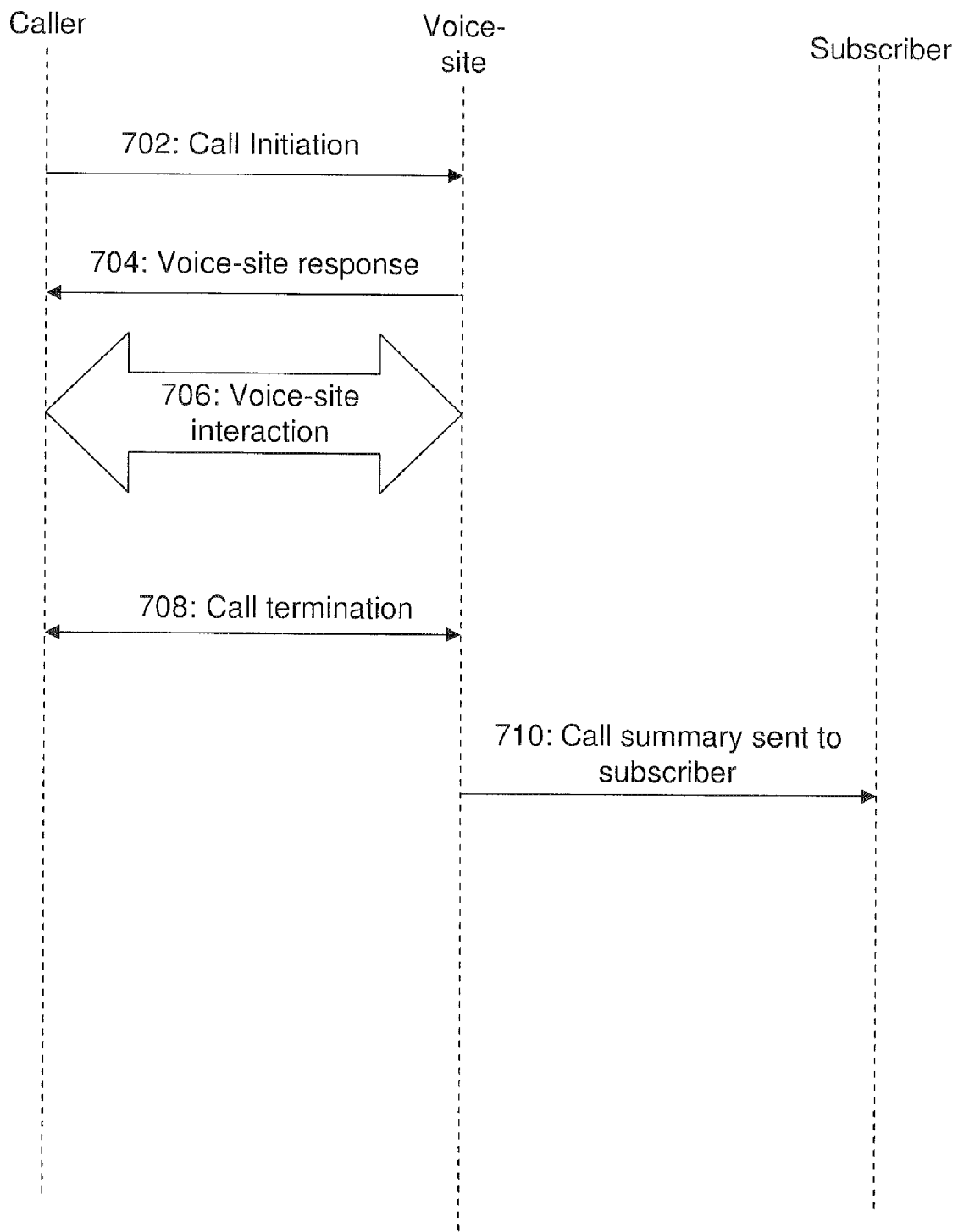
FIG. 7 is a schematic illustration of a call flow.

In a further embodiment as illustrated in FIG. 7, a caller initiates a call directed to a subscriber at step 702. The receiving means and the voice-site hosting means receives the call. In accordance with an embodiment of the present invention, the IVR module of the voice-site may provide a response to the caller at step 704. The voice response is received by the caller and a voice-site interaction is established between the caller and the voice-site at step 706. For example, for hosting business on a phone, the IVR modules may provide a complete list of items on sale, payment and delivery mechanisms. Further, IVR options may allow the caller to place an order and pay for any purchases done. In accordance with another example, the present invention may be used to provide matrimonial/dating service by connecting a potential match to the IVR module and allowing voice messages to be exchanged on offline mode, playing out individual preferences etc. In accordance with yet another example, the IVR modules may be employed by a grocery store with or without a retail outlet to take orders on phone and additionally provide links to other nearby stores/branches for items not locally available. In accordance with yet another example, the IVR modules may be employed in voice-based coaching classes/lectures. Once the interaction between the caller and the voice site ends, the call is terminated at step 708. A call summary of the interaction is sent to the subscriber at step 710.

Figure 8:
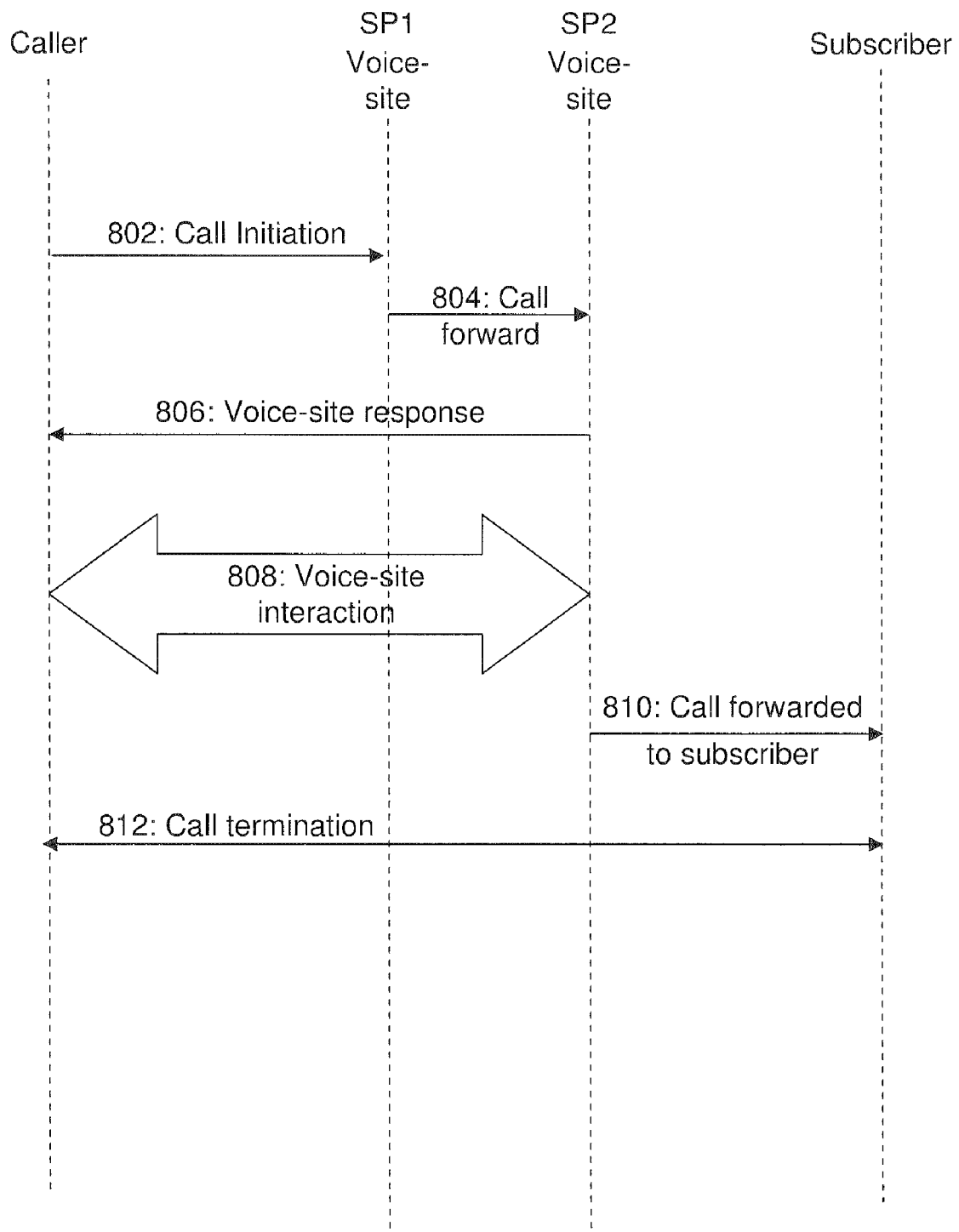
FIG. 8 is a schematic illustration of a call flow.

FIG. 8 illustrates a schematic representation where a caller initiates a call directed to a subscriber at step 802. The receiving means and the voice-site hosting means of Service Provider (SP1) receive the call. The voice site hosting means and the processing means determines the number to which the voice call is directed. In case the voice call is directed for a subscriber of a second Service Provider (SP2), the voice site hosting means and the processing means of SP1 forwards the voice call to the receiving means and the voice site hosting means of SP2 at step 804. In accordance with an embodiment of the present invention, the IVR module of the voice-site of the voice site hosting means and the processing means of SP2 corresponding to the caller's number may provide a adequate response to the caller at step 806. A voice-site interaction is established between the caller and the voice site at step 808.

In a further embodiment, the voice-site may forward the call to the subscriber, because, for example, of the absence of required information or as a result of the voice-site interaction with the caller at step 810. The call is terminated at step 812.

The present invention further facilitates a number of innovative applications to a telephone user and enables the telephone user to have a web presence in the telecommunication world. Further, the present invention provides new business models and new sources of revenue to the telecommunication service providers. Also, the present invention leads to new levels of personalization of individual telephones.

Figure 9A:
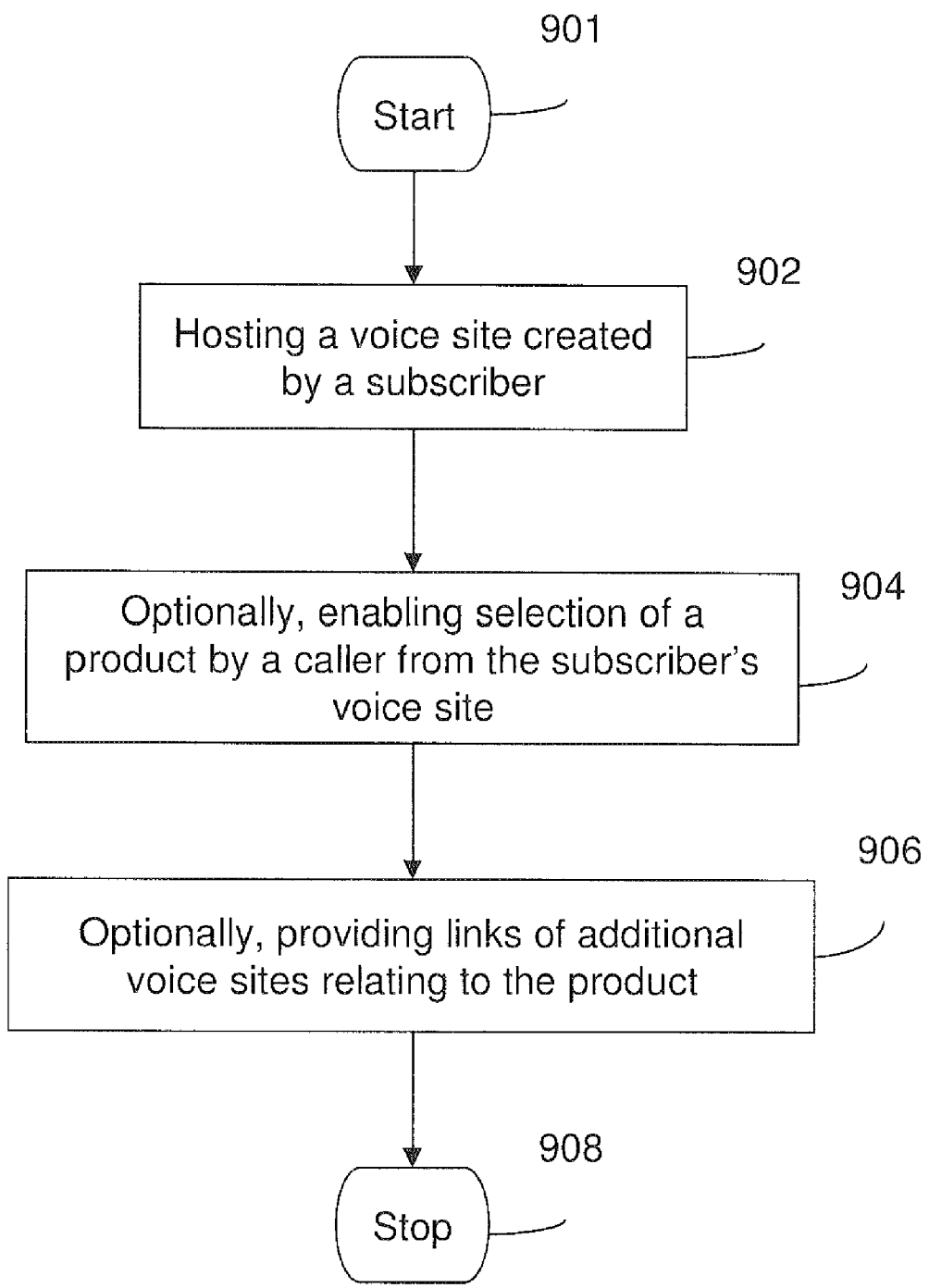
FIG. 9A depicts a flowchart for promoting at least one product using the linked network of voice sites built on at least one network in accordance.

FIG. 9A depicts a flowchart of a method 900 for providing voice based services by promoting at least one product of the subscriber on the voice sites The method 900 begins at step 901 and proceeds to step 902, wherein the voice site hosting means hosts a voice site created by a subscriber. The linked network of voice sites enables subscribers to offer products using the voice site. The voice site comprises details of the product (s), for example, the name, price, availability, quality, and name of the product manufacturer. The products get advertised once the voice-site engine hosts the voice site. The hosting includes advertising, for example, voice playback of the product when a caller visits the voice site.

The caller browses through the list of the products during the voice-interaction with the subscriber's voice site. Alternatively, the processing means and the IVR module enables a caller to select a product from the subscriber's voice site at step 904. In various embodiments, the caller may select the product either by speaking or keying in the product name or the product code. The caller may then order the selected product through the IVR menu options and select a payment mode. The payment details, including credit card/debit account details and delivery address, may either be pulled from the caller's profile maintained in the applications database, or the caller may specify them through the IVR module.

In a further embodiment, links of additional voice sites relating to the product are provided, if the product is not available on the voice site at step 906. Further, the voice site hosting means maintains profiles of at least one caller. The method ends at step 908.

Figure 9B:
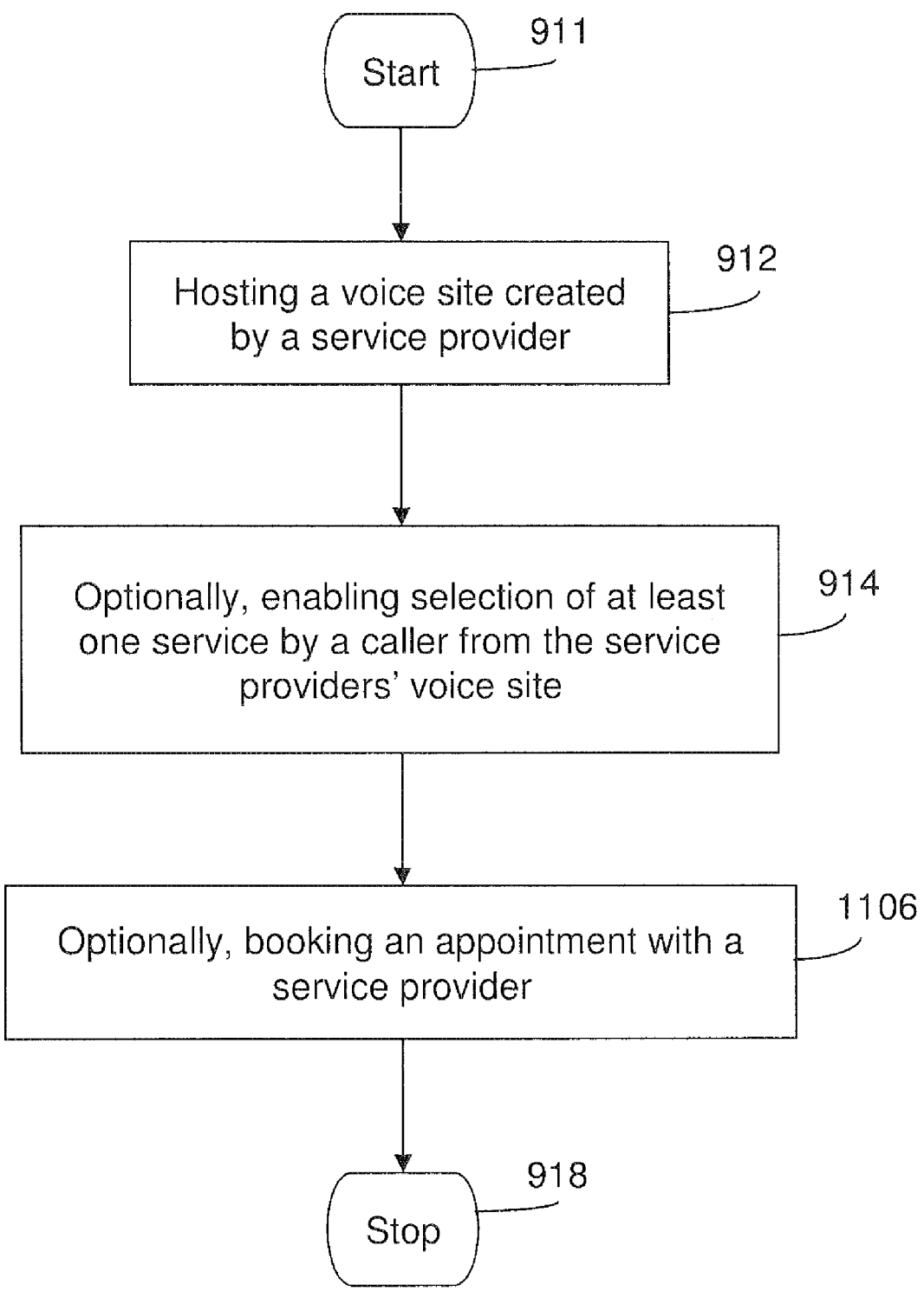
FIG. 9B depicts a flowchart for promoting at least one service using the linked network of voice sites built on at least one network.

FIG. 9B depicts a flowchart of a method for promoting at least one service using the linked network of voice sites built on at least one network, in accordance with an embodiment of the present invention. The method begins at step 911 and proceeds to step 912, wherein the voice site hosting means hosts a voice site created by a service provider. The voice site comprises menu options for at least one service offered by the service provider. The menu options may include access to desired information for a price, or may allow service providers such as plumbers, electricians, doctors and the like to be booked for an appointment. In an embodiment, the menu options provide access to the service information on payment basis. The services may include, without limitation, payment services, business partners, emergency services, Internet multimedia based services (IMS), shipping services, information dissemination services and directories.

By hosting the voice site, the services are advertised on the voice site of the subscriber to whoever calls the subscriber's number and visits that voice site. The advertising includes, for example, voice playback of the service when a caller visits the voice site.

The caller browses through the list of the services during the voice-interaction with the service provider's voice site. The caller to select a service from the service provider's voice site at step 914. In various embodiments, the caller may select the service either by speaking or keying in the service name or the service code. Optionally, at step 916, the caller may book an appointment with the service provider. However, if the service is not available on the voice site, optionally, the voice site may provide links of additional voice sites relating to the service. The method ends at step 918.

Figure 9C:
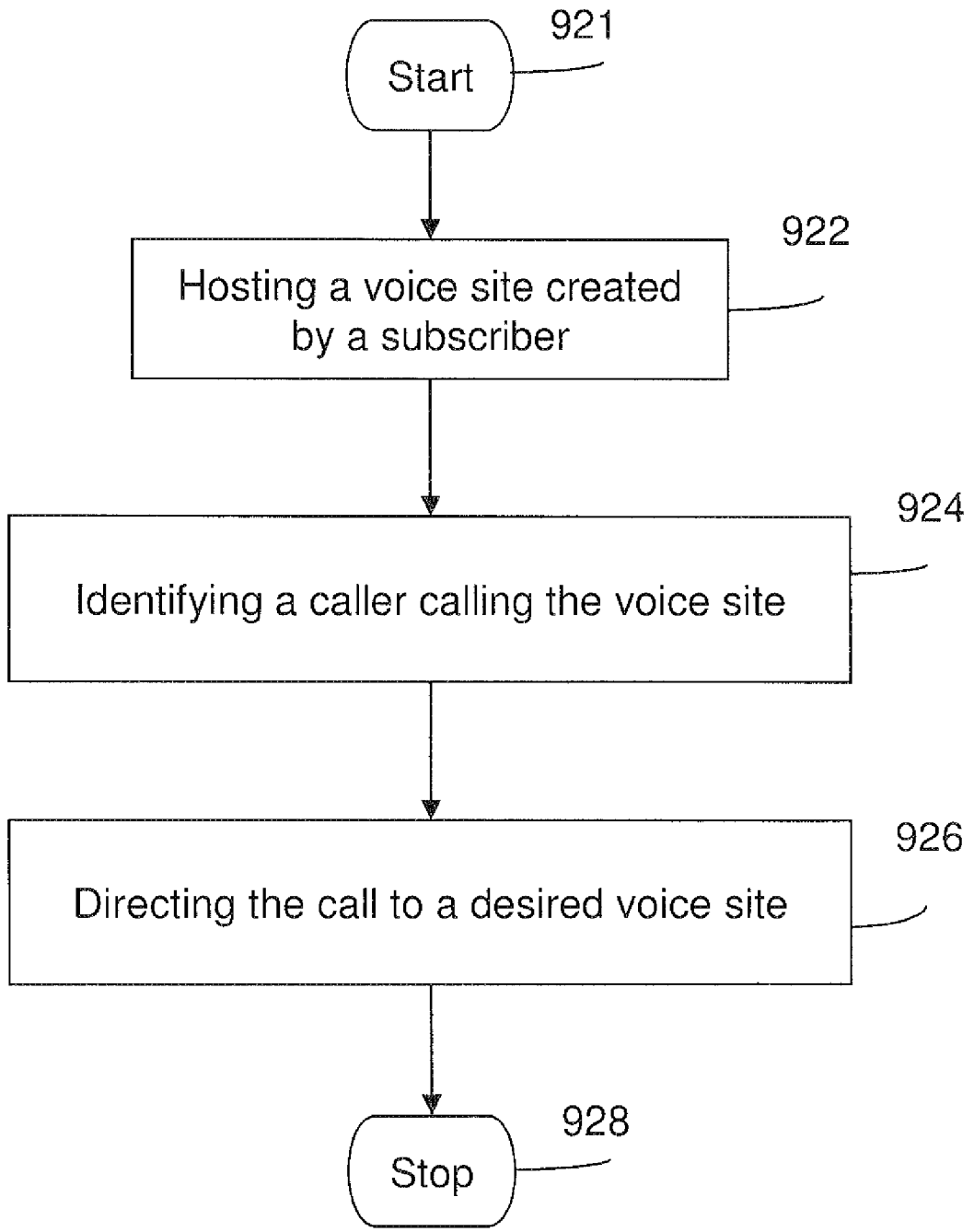
FIG. 9C depicts a flowchart for offering voice site hosting services to a subscriber.

FIG. 9C depicts a flowchart of a method for offering voice site hosting services to a subscriber, in accordance with an embodiment of the present invention. The method begins at step 921 and proceeds to step 922, wherein the voice site hosting means hosts a voice site created by the subscriber. In an embodiment, the voice site comprises an interactive voice response module. When a caller calls the subscriber, the IVR module identifies the caller calling the voice site through speaker identification, caller-id identification, and Personal Identification Number (PIN) identification at step 1204.

Based upon the caller identification, the voice site hosting means and the processing means either directs the call to a generic IVR module (for unknown callers) or to specific IVR modules (for instance, an IVR module for subscriber's spouse, one module each for her close friends, one for marketing calls etc.) at step 926. The method ends at step 928. In a further embodiment, the method enables searching of content in the IVR menu options or voice sites for fast and efficient querying. This search could be performed across multiple service providers.

While typical embodiments have been set forth for the purpose of illustration, the foregoing description should not be deemed to be a limitation on the scope of the present invention. Accordingly, various modifications, adaptations and alternatives may occur to one skilled in the art without departing from the spirit and scope of the present invention.

We claim:

1. A method for generating voice sites on a server, the method comprising:

receiving a voice call from a subscriber at a first voice site, where the first voice site is hosted on the server and the subscriber is associated with the first voice site;

enabling the subscriber to create and personalize a second voice site starting from the first voice site by specifying personal preferences of the subscriber and available components on the server via an interface comprising an interactive voice response module coupled to a voice browser, where the second voice site created by the subscriber comprises a list of services offered by the subscriber;

hosting the second voice site on the server;
receiving a voice call from a caller at the server wherein the voice call from the caller is directed to the subscriber;
identifying the caller at the server;
directing the voice call received from the caller to an appropriate voice site of the subscriber hosted on the server by dynamically interacting with the caller in real time; and
providing the caller with an appropriate response, the response comprising services available at the subscribers voice site,
wherein the appropriate voice site of the subscriber hosted on the server is configured to provide a call summary to the subscriber after the voice call is terminated.

2. The method of claim 1, further comprising enabling the subscriber to retrieve and edit the second voice site in response to a voice call from the subscriber, wherein editing the second voice site comprises incorporating suitable modifications as decided by the subscriber of the second voice site.

3. The method of claim 1, wherein the available components on the server may be a reusable dialog component maintained at the server by means of a registry.

4. The method of claim 1, further comprising:
forming a network of linked voices sites by linking the second voice sites of several relevant subscribers hosted on the server, wherein the voice sites are configured to provide voice based services.

5. The method of claim 1, wherein the second voice site may be hosted on a server that belongs to a different network than the home network of the subscriber.

6. The method of claim 5, wherein the voice sites may be provided with an electronic connection thereby creating an interconnected voice network.

7. The method of claim 5, further comprising:
connecting the voice call from the caller to the subscriber via the subscribers voice site.

8. The method of claim 1, wherein the server is configured to maintain a registry of services offered by the voice sites hosted on the server.

9. A system for generating voice sites on a server comprising:
a receiving means configured to receive a voice call from a subscriber at a first voice site, the first voice site associated with the subscriber;
processing means configured to enable the subscriber to create and personalize a second voice site starting from the first voice site by specifying personal preferences of the subscriber and available components on the server via an interface comprising an interactive voice response module coupled to a voice browser, and the second voice site created by the subscriber comprises a list of services offered by the subscriber; and
a means for hosting the second voice site on the server,
wherein the receiving means is further configured to receive a voice call from a caller at the server, wherein the voice call from the caller is directed to the subscriber and configured to identify the caller; and
wherein the processing means is further configured to direct the voice call received from the caller to an appropriate voice site of the subscriber hosted on the server by dynamically interacting with the caller in real time and to provide the caller with an appropriate response,
wherein the appropriate response comprises identifying services available at the subscribers voice site, and
wherein the appropriate voice site of the subscriber hosted on the server is configured to provide a call summary to the subscriber after the voice call is terminated.

10. The system of claim 9, wherein the processing means is further configured to enable the subscriber to retrieve and edit the second voice site in response to a call from the subscriber, wherein to edit the second voice site comprises incorporating suitable modifications as decided by the subscriber of the second voice site.

11. The system of claim 9, wherein the available components on the server may be a reusable dialog component maintained at the server by means of a registry.

12. The system of claim 9, further comprising:
the processing means being further configured to link the second voice sites of several relevant subscribers hosted on the server, thereby forming a network of linked voices sites.

13. The system of claim 9, wherein the second voice site may be hosted on a second server, where the second server belongs to a different network than the home network of the subscriber.

14. The system of claim 13, wherein the voice sites may be provided with an electronic connection thereby creating an interconnected voice network.

15. The system of claim 9, wherein the processing means is configured to connect the voice call from the caller to the subscriber via the subscribers voice site.

16. The system of claim 15, wherein the server is configured to maintain a registry of services offered by the voice sites hosted on the server.

* * * * *